(12) United States Patent
Bott et al.

(10) Patent No.: US 10,211,691 B2
(45) Date of Patent: Feb. 19, 2019

(54) PERMANENT MAGNET ROTOR FOR AN ELECTRIC MACHINE

(71) Applicant: Siemens Aktiengesellschaft, München (DE)

(72) Inventors: Erich Bott, Hollstadt (DE); Reiner Seufert, Salz (DE); Rolf Vollmer, Gersfeld (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 16/040,170

(22) Filed: Jul. 19, 2018

(65) Prior Publication Data

US 2018/0331589 A1 Nov. 15, 2018

Related U.S. Application Data

(62) Division of application No. 14/840,939, filed on Aug. 31, 2015.

(30) Foreign Application Priority Data

| Sep. 1, 2014 | (EP) | ...................................... 14183004 |
| Apr. 1, 2015 | (EP) | ...................................... 15162240 |
| Jul. 14, 2015 | (EP) | ...................................... 15176678 |

(51) Int. Cl.
*H02K 1/27* (2006.01)
*H01F 7/02* (2006.01)
*H02K 15/03* (2006.01)

(52) U.S. Cl.
CPC .............. *H02K 1/274* (2013.01); *H01F 7/021* (2013.01); *H02K 1/278* (2013.01); *H02K 1/2773* (2013.01); *H02K 15/03* (2013.01)

(58) Field of Classification Search
CPC ................... H02K 1/2726; H02K 1/274–1/278
See application file for complete search history.

(56) References Cited

U.S. PATENT DOCUMENTS

| 5,280,209 | A | 1/1994 | Leupold |
| 2004/0150283 | A1 | 8/2004 | Calfo et al. |
| 2008/0278018 | A1 | 11/2008 | Achor |
| 2012/0217834 | A1 | 8/2012 | Lutz |
| 2013/0049493 | A1 | 2/2013 | Zhao et al. |

FOREIGN PATENT DOCUMENTS

| CH | 549307 A | 5/1974 |
| DE | 25 50702 A1 | 5/1977 |
| DE | 27 56626 A1 | 6/1979 |
| DE | 10 2006 017233 A1 | 10/2007 |

(Continued)

*Primary Examiner* — Ramon M Barrera
(74) *Attorney, Agent, or Firm* — Henry M. Feiereisen LLC

(57) ABSTRACT

A permanent magnet having end surfaces and an envelope curve shaped as a biconvex lens having first and second convex portions, magnetization running in an arcuate manner along the first convex portion between a north pole and a south poles. The permanent magnet runs along the second convex portion in an arcuate manner, and at least one of the magnet's end surfaces within the envelope curve has a connection surface adapted for connecting with a connection device by fusing or by positive engagement. The rotor is preferably pressed onto the shaft of the rotor after the connection device is formed around a connection surface of the permanent magnets by injection molding.

19 Claims, 7 Drawing Sheets

(56) References Cited

FOREIGN PATENT DOCUMENTS

| | | |
|---|---|---|
| DE | 10 2012 107 610 A1 | 2/2013 |
| DE | 102012107610 A1 | 2/2013 |
| DE | 10 2013 007563 A1 | 11/2014 |
| EP | 1475880 A2 | 11/2004 |
| EP | 2770616 A1 | 8/2014 |
| JP | S5179613 U | 6/1976 |
| JP | S552313 A | 1/1980 |
| JP | 2003124019 A | 4/2003 |
| JP | 2010527224 A | 8/2010 |
| WO | WO 0176040 A1 | 10/2001 |

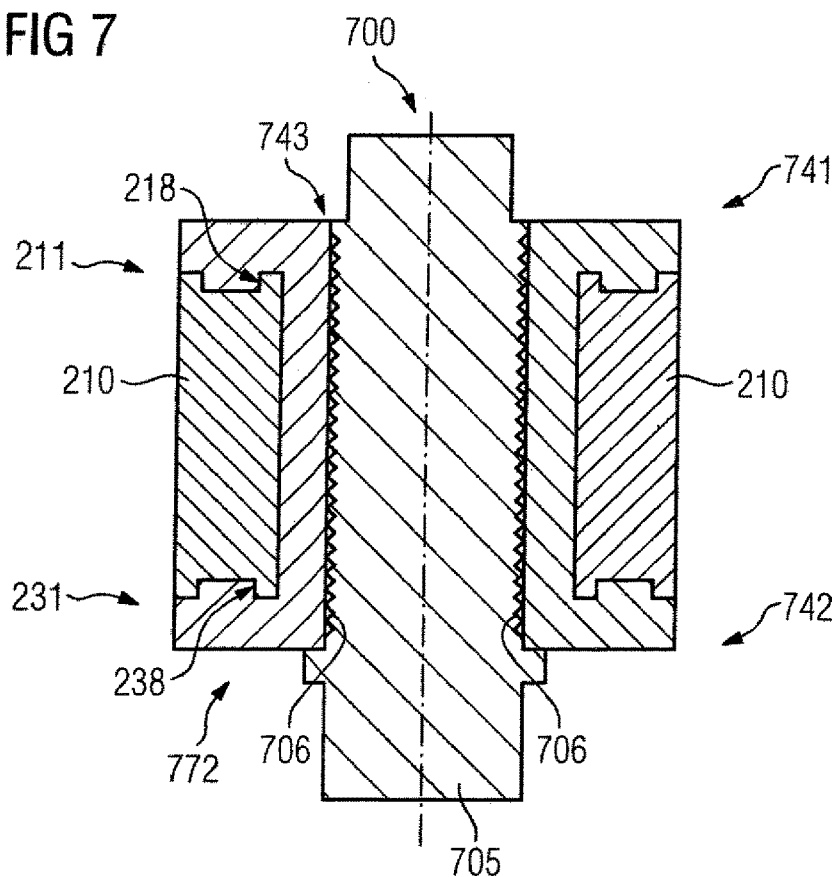
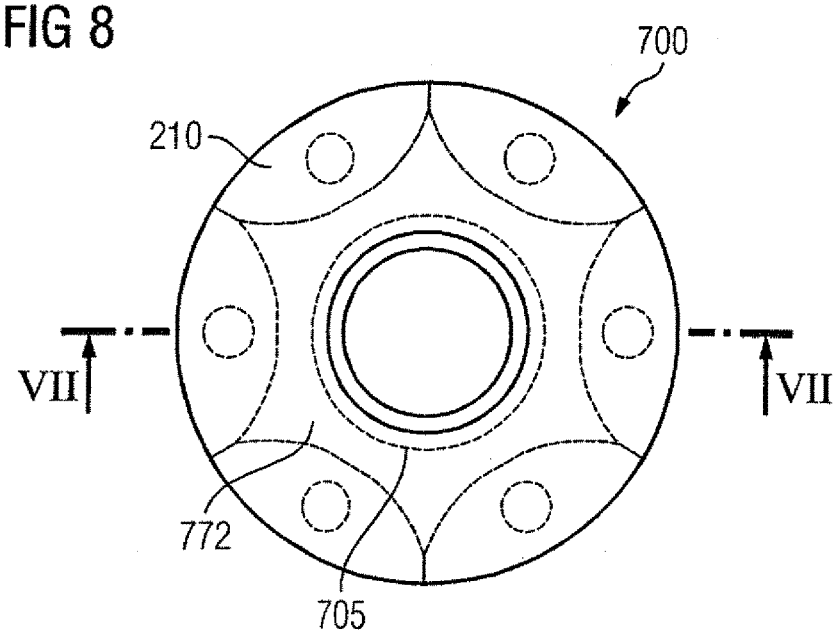

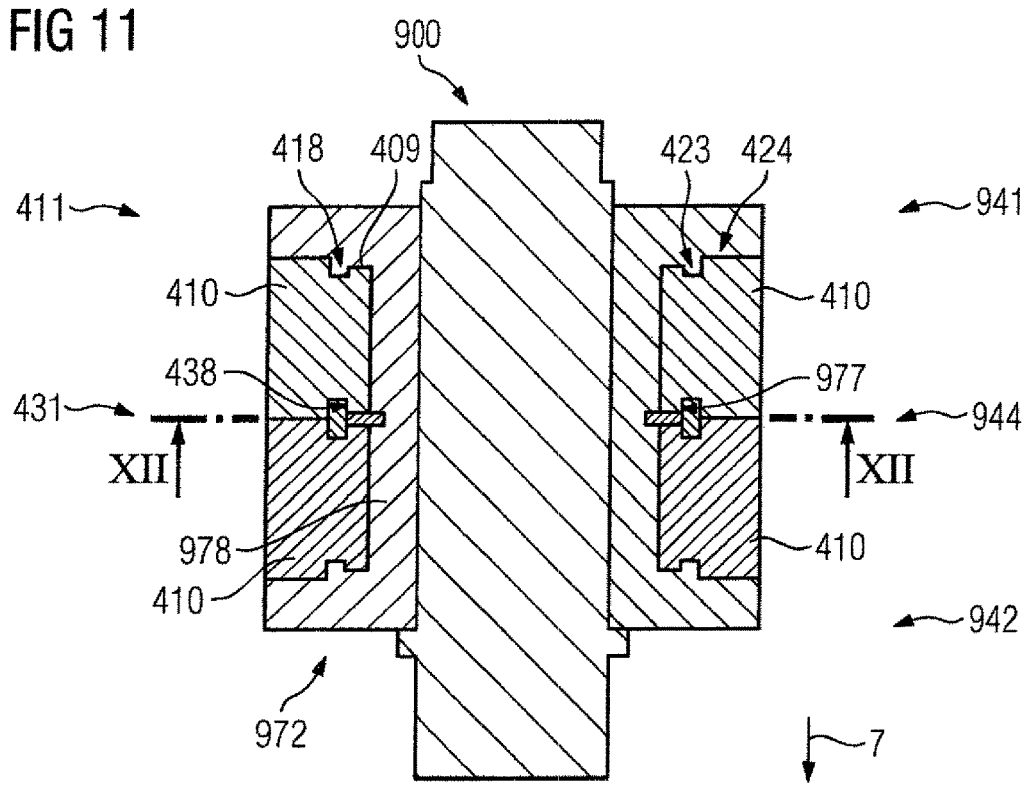
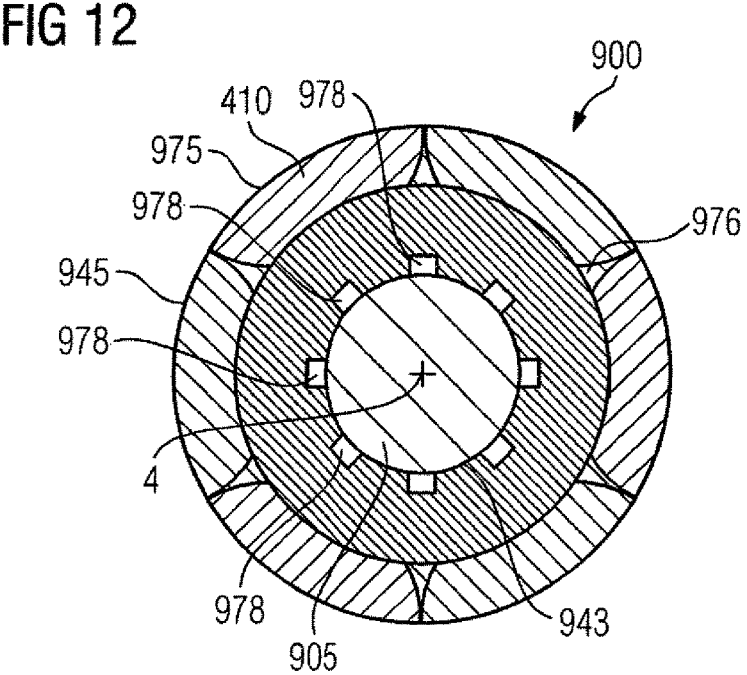

PERMANENT MAGNET ROTOR FOR AN ELECTRIC MACHINE

CROSS-REFERENCES TO RELATED APPLICATIONS

This application is a divisional of prior filed copending U.S. Application No. 14/840,939, filed Aug. 31, 2015, the priority of which is hereby claimed under 35 U.S.C. § 120 claims the priority of European Patent Applications, Serial Nos. 14183004, filed Sep. 1, 2014, Ser. No. 15162,240, filed Apr. 1, 2015, and Ser. No. 15176,678, filed Jul. 14, 2015, pursuant to 35 U.S.C. 119(a)-(d), the contents of which are incorporated herein by reference in their entireties as if fully set forth herein.

BACKGROUND OF THE INVENTION

The present invention relates to permanent magnets. More particularly, the invention relates to a permanent magnet used in a rotor of an electric machine, and to a use of permanent magnets in the rotor of the electric machine.

A permanent magnet described in CH 549 307 A has the shape of a horseshoe wherein its yoke is innermost and its limbs are directed outwards. This permanent magnet does not necessarily have the external shape of a horseshoe, since the cited publication discloses that the magnet may be formed in the shape of a hexagonal or segment-type block. In addition to creating the U or V shape of the permanent magnet using individual rectangular permanent magnets, magnets having the shape of a U or V in a single piece are also described. The limbs of the magnet extend radially outwards, such that the two magnetic poles of the permanent magnet are located at circumferentially separate points on the outermost radial surface of the magnet. The magnets in that publication are made of a material having a high coercive force and may be a ceramic or metallic mass or a mixture of Iron powder that is bonded by rubber or resin. Permanent magnets are usually magnetized before assembly, but a stator winding may also be used for magnetizing them or setting a magnetization level.

In that publication, the permanent magnets are used in a permanent magnet rotor for alternating current machines, in particular synchronous motors or synchronous generators. The rotor preferably includes a squirrel-cage winding, which is already known, in order to provide the breakaway moment in a manner similar to the way in which it is provided in squirrel-cage motors. The permanent magnets and the rods can both be held in place by a cast aluminum body, if the rotor end ring of the squirrel-cage winding is an aluminum casting. An adhesive may be used to hold the magnets in place during the casting process. If the squirrel-cage rotor Is made of copper rods, the magnets can be held by the copper rods or a combination of the copper rods and an adhesive that attaches the magnets to the coil, e.g. epoxy resin.

It would be desirable and advantageous to address prior art shortcomings.

SUMMARY OF THE INVENTION

According to one aspect of the present invention, a permanent magnet includes a north pole and a south pole, with a magnetization running from the south pole to the north pole in a cross section of the magnet, an envelope curve on the cross section of the permanent magnet having a bi-convex lens shape, the envelope curve having a first convex portion and a second convex portion, the magnetization in the permanent magnet running in an arcuate manner along the first convex portion of the envelope curve, and the permanent magnet also running in an arcuate manner along the second convex portion of the envelope curve, and end surfaces at a first end and a second end of the permanent magnet within the envelope curve, at least one of the end surfaces having a connection surface adapted for connecting a connection device to the permanent magnet.

In accordance with the present invention, a permanent magnet is constructed to connect to a connection device of the rotor of an electric in an inexpensive and high-quality manner, thereby providing inexpensive, high quality electric machines. The invention provides a method whereby the rotor of an electric machine can be connected to a permanent magnet in an Inexpensive, high-quality manner.

A permanent magnet according to the invention has a north and a south magnetic pole, and a magnetization that can run from the south pole to the north pole in a cross section of the permanent magnet, the cross section having an envelope curve that is shaped as a bi-convex lens. The permanent magnet comprises the first convex portion and a second convex portion, the magnetization of the permanent magnet running in an arcuate manner along the first convex portion, the permanent magnet running in an arcuate manner along the second convex portion, and having end surfaces at a first end and a second end of the permanent magnet, at least one of the end surfaces within the envelope curve has a surface used in connecting a connection device to the permanent magnet.

According to another aspect of he present invention, a rotor for an electric machine includes a permanent magnet extending from a first end to a second end of the permanent magnet parallel to an axis of rotation, a first convex portion of the permanent magnet being disposed along an envelope curve of the rotor, and having respective end surfaces at a first end and a second end of the permanent magnet within the envelope curve, at least one of the end surfaces having a connection surface adapted for connecting a connection device to the permanent magnet, and a connection device having a connection with the connection surface of the permanent magnet.

According to still another aspect of the present invention, an electric machine includes a rotor rotatably supported for rotation about an axis of rotation, a permanent magnet extending from a first end to a second end of the permanent magnet parallel to the axis of rotation, a first convex portion of the permanent magnet being disposed along an envelope curve of the rotor, and having respective end surfaces at a first end and a second end of the permanent magnet within the envelope curve, at least one of the end surfaces having a connection surface adapted for connecting a connection device to the permanent magnet; and a connection device having a connection with the connection surface of the permanent magnet, and a stator located to magnetically interact with the rotor across an air gap during the operation of the electric machine.

In accordance with the invention, a permanent magnet in a rotor of an electric machine includes a connection between a connection device and at least one surface of one of the end surfaces of the permanent magnet, and a cross section of the permanent magnet has an envelope curve that has the shape of a biconvex lens. Because the envelope curve of the cross section of the permanent magnet has a biconvex-lens shape in accordance with the invention, the surface of at least one end surface of the permanent magnet can be used to connect to the permanent magnet in an advantageously inexpensive and high-quality manner; also, the magnetization of the permanent magnet runs from the south pole to the north pole in an arcuate manner so that lateral magnetization can advantageously be provided using a modest amount of magnetic material.

Because of lateral magnetization in accordance with the invention, the north pole and the south pole are provided along the first convex portion of the biconvex envelope curve in an advantageously space-saving manner, that is, on one side of the permanent magnet. Because the first convex portion and the second convex portion are arranged reciprocally in a biconvex-lens shape, the end surfaces of the permanent magnet provide advantageously large surfaces for the connection of a connection device to the permanent magnet, a connection device in an electric machine, in particular.

The permanent magnet extends in a first direction from its first end to its second end. The cross section of the permanent magnet extends in a plane defined by a second direction and a third direction. The second direction and the third direction are perpendicular to the first direction. In a particular embodiment, at least one of the end surfaces of the permanent magnet of may be included in an envelope curve of the cross section. Thus, since the end surface does not project beyond the envelope curve, the end surface can be used in an electric machine and produced in an advantageously inexpensive and high-quality manner.

A rotor in accordance with the invention has the further advantage that a rotor having advantageously small dimensions can be provided in an advantageously inexpensive and high-quality manner. In accordance with the invention, the permanent magnets can advantageously have a modest height, said height being measured as the greatest distance between the first and the second convex portions.

A rotor in accordance with the invention can have at least two permanent magnets extending parallel to an axis of rotation from their first end to their second end. The first convex portions of the permanent magnets are disposed on a circular profile curve of the rotor that is concentric with the axis of rotation of the rotor. The rotor has at least one connection device and includes connections between the connection device and a surface of the permanent magnets. Thereby an advantageously smoother rotational movement of the rotor about the axis of rotation can be achieved.

According to another advantageous feature of the present invention, the north pole of one permanent magnet can be located next to the north pole of the closest permanent magnet along the circular profile curve of the rotor. Each magnetic pole of a rotor in this embodiment therefore can therefore include the same pole of each of the two closest permanent magnets along the envelope curve of the rotor in an advantageously inexpensive and high-quality manner. The distance between one permanent magnet and the next closest permanent magnet, thus, need not correspond to the distance between the north pole and the south pole of the same permanent magnet so that an electric machine having advantageously small dimensions can be provided in an advantageously inexpensive and high-quality manner.

Permanent magnets that are attached to a rotor in accordance with the invention in an advantageously space-saving manner using the connection surface of the permanent magnets that is described above can have an advantageously high level of air-gap induction, because of the space-saving provided using that connection surface, in accordance with the invention. In particular, bandaging the entire rotor can be dispensed with because of that connection surface. Thus the magnetic poles of the permanent magnets are not completely covered by a connection device in the air gap, e.g. a bandage. Advantageously, they are not covered at all. It is therefore advantageously possible to further increase the air-gap Induction, or to reduce the dimensions of the electric machine in accordance with the invention.

According to another advantageous feature of the present invention, the rotor can be attached to a shaft that is rotatably supported for rotation about its axis of rotation by first and second bearing devices. When the electric machine is operated as a generator, the rotor of an electric machine is set into motion about the axis of rotation by mechanical energy. The mechanical energy can be converted into electrical energy by the magnetic Interaction between magnetic poles of the rotor and the stator across the advantageous air gap provided in accordance with the invention. The electrical energy thus produced in the stator contributes to forming the electromagnetic poles of the stator and is drawn off from at least one winding of the stator by connecting an electric load to the winding. When the electric machine is operated as a motor, electrical energy can then be supplied to the stator using at least one winding, and the electrical energy can be converted into mechanical energy as a result of the magnetic interaction across the advantageous air gap between the magnetic poles of the stator and of the rotor provided in accordance with the invention. This produces a rotational moment that initiates rotation of the rotor about its axis of rotation and the mechanical energy is then delivered to a mechanical load by this rotational movement of the shaft of the rotor.

Use of the permanent magnet in accordance with the invention, has the further advantage that a permanent magnet having advantageously small dimensions can be supplied in an inexpensive, high-quality manner. It is therefore possible to economize on the space needed to transport the permanent magnets and the associated safety precautions that transport requires.

According to another advantageous feature of the present invention, the connection surface on the end surface of the first end can be connected to the connection device by fusing. In particular the permanent magnet can advantageously be fused to the connection device along a plane, which has the advantage that fusing along a plane can be produced using simple instruments and simple motion sequences.

According to another advantageous feature of the present invention, the connection surface on the permanent magnet advantageously can be un-machined. Because the connection surface is un-machined, a high-quality, inexpensive connection can be achieved without a coating. The un-machined surface of the permanent magnet allows the transfer of strong forces to the connection device, since the fused layer between them adheres better to the surface of permanent magnet because of its roughness. Any finishing of the connection surface after sintering the permanent magnet may be dispensed with.

According to another advantageous feature of the present invention, the surface of the permanent magnet may have a coating. It is then advantageously possible to inexpensively achieve a high-quality connection that achieves that transfer of strong forces by fusing the connection device, the coating and a permanent magnet together, according to the invention. In this context, the surface may be machined or un-machined before the coating is applied to the permanent magnet.

According to another advantageous feature of a permanent magnet according to the invention, the end surface on the first end can have a contour that includes the connection surface. In this way, the connection device can be connected to the permanent magnet by positive engagement. The contour may advantageously be produced at the end surface, which can be advantageously large surface because of the biconvex lens shape of envelope curve and the arcuate course of the magnetization in the permanent magnet.

According to another advantageous feature of a permanent magnet according to the invention, the contour can include a recess in the end surface of the first end. Because of the advantageously large connection surface, despite the recess, it is possible for the recess to have a boundary that avoids the recess's damaging the permanent magnet. The recess may advantageously comprise a groove. A groove has the advantage of being able to absorb force components that act on the permanent magnet parallel to the cross section, which are distributed over the connection surface in accordance with the particular course of the groove.

According to another advantageous feature of a permanent magnet according to the invention, the contour can include a ridge that protrudes from the end surface. A ridge has the advantage that it can be easily embedded in the connection device to provide positive engagement with the connection device.

According to another advantageous feature of a permanent magnet according to the invention, the contour can have a circular boundary. The circular boundary provides an advantageously large connection surface.

According to another advantageous feature of the present invention, the boundary of the contour on the connection surface can extend in an arcuate manner from a first point on the second convex portion to a second point on the second convex portion. Therefore force components acting on the connection device parallel to the cross section of the permanent magnet can advantageously be absorbed by the boundary of the contour. This is particularly advantageous in the case of a rotor in which forces act in a radial direction.

According to another advantageous feature of the present invention, the connection device can have a connection part having a circumferential lip that provides positive engagement with the boundary of the contour. Thus, the positive engagement of the connection device to the permanent magnet includes a positive engagement with the circumferential lip. In this way, strong forces from the boundary can advantageously be absorbed by the circumferential lip, particularly in the case of a rotor according to the invention, since the circumferential lip has no beginning or end and therefore when the forces act on the lip they are distributed over the whole circumferential lip.

According to another advantageous feature of the present invention, the permanent magnet can have a recess in the first convex portion between the north pole and the south pole. In an electric machine according to the invention, the surface of the rotor that faces the air gap advantageously has a recess between the north pole and the south pole of the permanent magnet.

According to another advantageous feature of the present invention, the permanent magnet can run along a first convex portion between the north pole and the south pole. In a machine according to the invention, the surface of the rotor that faces the air gap can advantageously has a continuous surface between the north pole and the south pole of the permanent magnet.

According to another advantageous feature of the present invention, the permanent magnet can be a sintered permanent magnet.

A permanent magnet in accordance with the invention advantageously provides a high level of air-gap induction in a space-saving manner because of the strong magnetic force and reliable connection of the permanent magnet to the rotor in accordance with the invention.

According to another advantageous feature of the present invention, the rotor can have a connection to the connection device on an end surface at a first axial end of the rotor and a second connection to the connection device on an end surface at a second axial end of the permanent magnet. In particular, the permanent magnets connected to the rotor at both of their end surfaces can thereby advantageously be attached within the envelope curve of the rotor.

According to another advantageous feature of the present invention, a third connection can be provided between a pair of permanent magnets between the first and a second axial ends of the rotor. In this way, a plurality of permanent magnets can advantageously be attached to the rotor one behind the other in an axial direction.

According to another advantageous feature of a rotor according to the present invention, an annular connection part can extend annularly in a cross section of the rotor between ends of two permanent magnets, the annular connection part being concentric with the profile curve of the rotor. It is thereby possible to achieve an advantageously uniform distribution of centrifugal forces on the connection device during operation of the electric machine and, in the case of a plurality of permanent magnets located one behind the other in an axial direction, advantageously ensures little or no interruption in the profile of the rotor by the connections between permanent magnets arranged one behind the other in the axial direction.

According to another advantageous feature of the present invention, the permanent magnet can be embedded in the connection device. The requirements relating to the dimensional accuracy of the permanent magnet can then be advantageously modest, since the connection device fills the gaps which are present due to any lack of dimensional accuracy of the permanent magnet. It is therefore advantageously possible e.g. to dispense with mechanical finishing of a permanent magnet after sintering.

BRIEF DESCRIPTION OF THE DRAWINGS

Other features and advantages of the present invention will be more readily apparent upon reading the following description of currently preferred exemplified embodiments of the invention with reference to the accompanying drawing, in which:

FIG. 7 is a longitudinal section view of a rotor having permanent magnets of the embodiment that is shown in FIG. 5;

FIG. 8 is a view of the rotor of FIG. 7 along an axis of rotation of the rotor from a first axial end of the rotor;

FIG. 11 is a longitudinal section of a rotor having permanent magnets of a fifth exemplary embodiment of a rotor according to the invention;

FIG. 12 is a cross section of the rotor of FIG. 11, taken along the section line XII-XII.

DETAILED DESCRIPTION OF PREFERRED EMBODIMENTS

Figure 1:
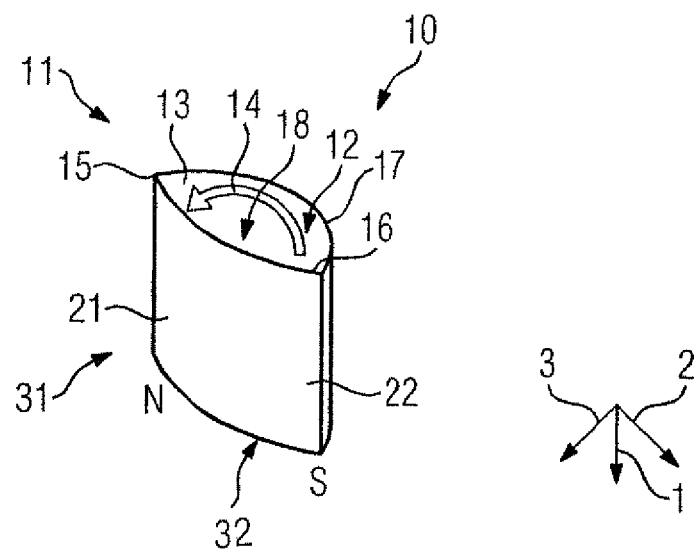
FIG. 1 is a cross section of a first exemplary embodiment of a permanent magnet according to the invention.

Throughout all the figures, same or corresponding elements may generally be indicated by same reference numerals. These depicted embodiments are to be understood as Illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a first exemplary embodiment of a permanent magnet 10 according to the invention, including a north pole 21 and a south pole 22 as magnetic poles, and end surfaces 12, 32, on a first end 11 and a second end 31. The shape of envelope curve 15 of the cross section 13 of the permanent magnet 10 is a biconvex lens having a first convex portion 16 and a second convex portion 17. All cross sections of the permanent magnet 10 along that first direction 1 have identical envelope curves 15.

A lateral magnetization 14 runs along the first convex portion 16 of the envelope curve 15 in an arcuate manner, so that the permanent magnet 10 provides the north pole 21 and the south pole 22 on one side of the permanent magnet 10, along that first convex portion 16. The permanent magnet 10 extends along the second convex portion 17 in an arcuate manner. At least one of the end surfaces 12 has a surface portion 18 within the envelope curve 15 that includes a connection surface where the permanent magnet 10 is fused to a connection device.

A height of the permanent magnet 10 is measured as the greatest distance between the first convex portion 16 and the second convex portion 17. The cross section 13 of the permanent magnet 10 extends in a plane defined by a second axis 2 and a third axis 3. The axes that indicate the second direction 2 and the third direction 3 run perpendicular to the axis of the first direction 1. In FIG. 1, surface portion 18 on the end surface 12 at the first end 11 of the permanent magnet 10 is a plane surface. The permanent magnet 10 is a sintered permanent magnet that extends from the north pole 21 and the south pole 22 along the first convex portion 16.

Figure 2:
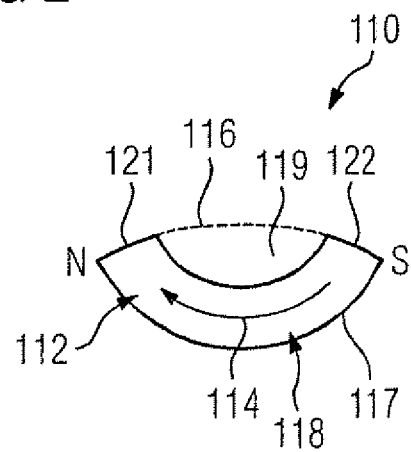
FIG. 2 shows an end surface of a second exemplary embodiment of a permanent magnet according to the invention.

FIG. 2 is a view of an end surface 112 of a second exemplary embodiment of a permanent magnet 110 according to the invention, which has features that are described above with reference to FIG. 1, but has reference numerals that are produced by adding the prefix "1" or "10" to reference numerals appearing in FIG. 1. The features of the permanent magnet 110 that differ from the permanent magnet 10 are as follows: The permanent magnet 110 has a recess 119 in the second convex portion 117 between the north pole 121 and the south pole 122 of the first convex portion 116. The surface 118 of the permanent magnet 110 that includes a connection surface where the permanent magnet 110 is fused to a connection device is un-machined; more specifically, the surface 118 on the end surface 112 of the permanent magnet 110 was not mechanically machined after sintering.

Figure 3:
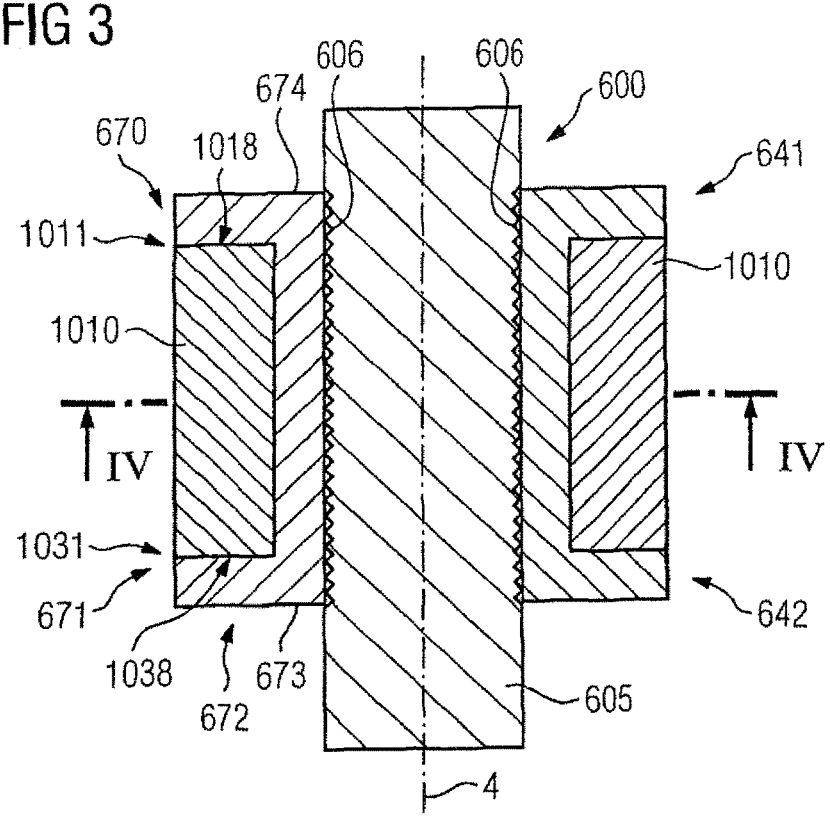
FIG. 3 is a longitudinal section view of the embodiment of FIG. 1.

FIG. 3 shows a longitudinal section through a first exemplary embodiment of an inventive rotor 600 wherein the permanent magnets 1010 of the rotor 600 extends parallel to the axis of rotation 4 from its first end 1011 to its second end 1031, and the rotor 600 includes the connection 670 between a connection device 672 and the surface 1018 of the permanent magnet 1010. The permanent magnet 1010 shown in FIG. 3 has features related to features of the permanent magnet 10 of FIG. 1, and here the reference numerals are prefixed with a "10".

However, the permanent magnet 1010 in FIG. 3 has coated surfaces 1018, 1038. The first connection device 672 comprises a synthetic material that forms a connection to the permanent magnet 1010 by fusing with its coating. To provide the connections 670, 671, between the connection device 672 and the surfaces 1018, 1038, of the respective end surfaces at the first end 1011 and second end 1031 of the permanent magnet 1010, the synthetic material of the connection device 673 is heated to fuse those connections 670, 671. The rotor 600 has a first connection of the connection device to the coated surface 1018 at a first axial end 641 of the permanent magnet 1010 and a second connection 671 of the connection device 672 to the coated surface 1038 at the second end 1031 of the permanent magnet 1010. The rotor 600 comprises a shaft 605 that extends along the axis of rotation 4. The shaft 605 has knurling 606 that extends along the connection device 672 in a direction parallel to the axis of rotation 4. Attachment of the permanent magnets 1010 to the shaft 605 via the connection device 672 is provided by injection molding. In the injection molding process, the shaft 605 and the permanent magnets 1010 are positioned accordingly, and the synthetic material of the connection device 672 is injected by an injection molding instrument between the permanent magnets 1010 and the shaft 605 and onto the first and second ends 1011, 1031 of the permanent magnets 1010. The Injection molding material forms the first connection 1018 and second connection 1038 at the end surfaces of the permanent magnets 1010 by fusing with them, so that the permanent magnets 1010 are embedded in the connection device 772. Moreover, because of the knurling 606 on the shaft 605, the fused connection there provides a positive connection between the shaft 605 and the connection device 672.

The first and second ends 1011, 1031, of the permanent magnets 1010 include respective end surfaces 1018, 1038, for making connections 670, 671, between the connection device 672 and the permanent magnet 1010 within the envelope curve 1015 of the cross section of the permanent magnets 1010. Because the end surfaces 1018, 1038, the permanent magnets 1010 are attached inside the ends 670, 671, of the connection device 672, the outer surfaces 673, 674, of the connection device 672 can advantageously provide inexpensive and high-quality limit stops for the bearings of respective first and second bearing devices 58 on the rotor 600 in an electric machine 61.

Figure 4:
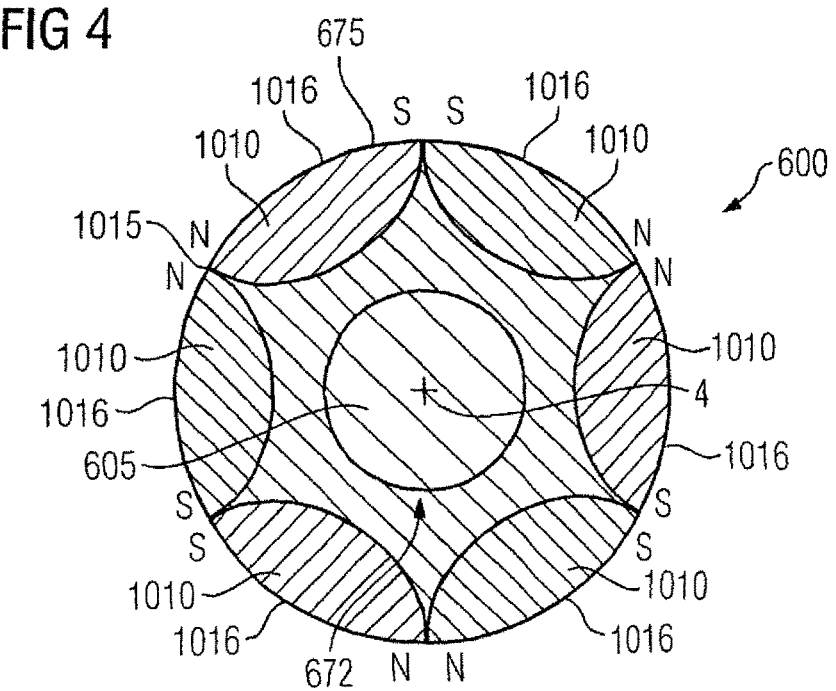
FIG. 4 is a cross section view of the rotor of FIG. 3, taken along the section line IV-IV.

FIG. 4 shows a cross section of the rotor 600 of FIG. 3 at the section line IV-IV. The permanent magnets 1010 on the rotor 600 provide at least two first convex portions 1016 on the circular profile curve 675 of the rotor 600 that is concentric with the axis of rotation 4. The permanent magnets 1016 extend from a first end 1011 to a second end 1031 parallel to the axis of rotation 4. In FIG. 4, the circular curve provided by the first convex portions 1016 cannot be distinguished from the circular profile curve 675 of the rotor 600, since they completely cover the circular envelope curve 675, at least in the pictorial illustration, and therefore the circular profile curve 675 in FIG. 4 is shown as being congruent with the first convex portions 1016 of the permanent magnets 1010 on the rotor 600. Along the circular profile 675 of the rotor 600, the same poles of the adjacent permanent magnets 1010 are adjacent to each other: a north pole of one permanent magnet 1010 is adjacent to the north pole of the next permanent magnet 1010, and so on.

Figure 5:
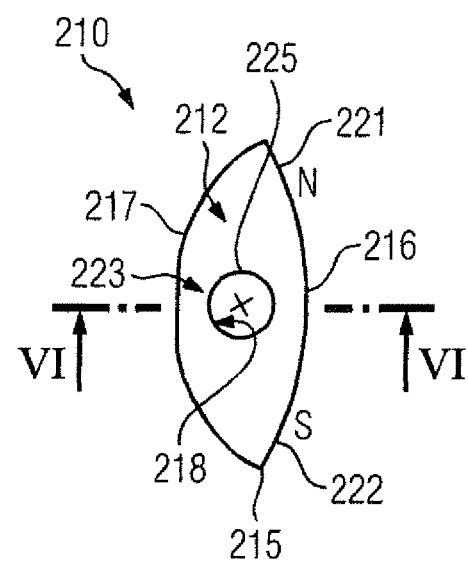
FIG. 5 shows an end surface of a permanent magnet of a third exemplary embodiment of the invention.

FIG. 5 shows an end surface 212 of a third exemplary embodiment of a permanent magnet 210 according to the invention. This embodiment also has features that are related to features described above with reference to FIG. 1, but their reference numerals have the prefix "2". The end surface 212 on the first end 211 of the permanent magnet 210 has a contour 223 that includes the recess surface 218 where the connection device 772 is connected to the permanent magnet 210 in a positive engagement. The contour 223 has a circular boundary 225, at which the recess surface 218 extends into the recess 224.

Figure 6:
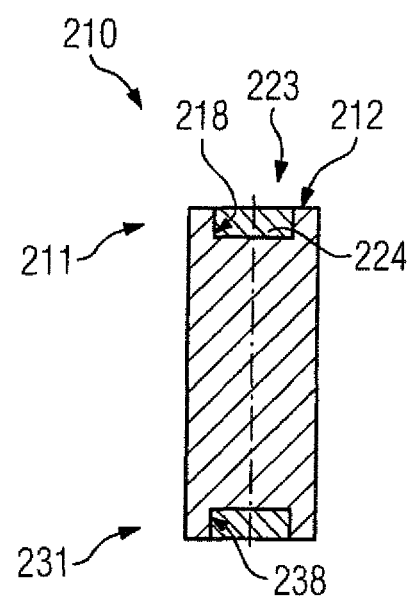
FIG. 6 is a longitudinal section view of the embodiment of FIG. 5, taken along the section line VI-VI.

FIG. 6 shows a longitudinal section of the permanent magnet 210 of FIG. 5 along the section line VI-VI. The contour 223 on the permanent magnet 210 has a recess 224 in the end surface 212 of the first end 211 of the permanent magnet 210. On the surface 238 at the second end 231 of the permanent magnet 210 is a similar contour for a second connection providing positive engagement of the connection device 772 to the permanent magnet 210. In a further exemplary embodiment of a permanent magnet according to the invention (not shown), instead of a recess 224, the contour comprises a ridge that protrudes from the end surface, the surfaces providing the positive-engagement connection are located on the protruding ridge, instead of in the recess 224.

FIG. 7 shows a longitudinal section of a third exemplary embodiment of a rotor 700 in accordance with the invention having permanent magnets 210 of the type shown in FIG. 5. Features of FIG. 7 related to features described above with reference to FIG. 3 and FIG. 4 have reference numerals in which the "6" has been replaced by a "7" in FIG. 7. Like the rotor 600, the permanent magnets 210 of the rotor 700 are embedded in the connection device 772 by injection molding, using an injection molding instrument. The first convex portion 216 of each permanent magnet 210 is on the circular profile curve of the rotor 700 that is concentric with the axis of rotation 4.

Unlike the rotor 600, the rotor 700 has a first connection that provides positive engagement with a surface 218 on the first end 211 of the permanent magnet 210 at the first axial end 741 of the rotor 700, and a second connection that provides positive engagement with a surface 238 on the second end 231 of the permanent magnet 210 at the second axial end 742 of the rotor 700 with the connection device 772. This means that, unlike the rotor 600, the shaft 705 of the rotor 700 can be installed separately. The connection device 772 has an opening 743 for the shaft 705. After the permanent magnets 210 have been attached and are embedded in the connection device 772, the shaft 705 can be pressed through the opening 743 in order to attach the connection device 772 to the shaft 705 using frictional engagement.

Because the shaft 705 is pressed through the opening 743 in the connection device 772 in FIG. 6, the shaft 705 is continuously subject to frictional engagement forces acting on it. In FIG. 7, those forces also enhance connections between the connection device 772 and the permanent magnets 210 in an inexpensive, high-quality manner. For example, those forces enhance the frictional engagement of the end surface 218 at the first end 211 of the permanent magnet 210 that connects the connection device 772 to the permanent magnet 210 in an advantageously inexpensive and high-quality manner.

FIG. 8 shows a cross section view of the rotor of FIG. 7, at the first axial end of the rotor 700. In FIG. 8, dashed lines indicate features of the permanent magnets 210, the connection device 772, and the shaft 705, that cannot be seen in this cross section view.

Figure 9:
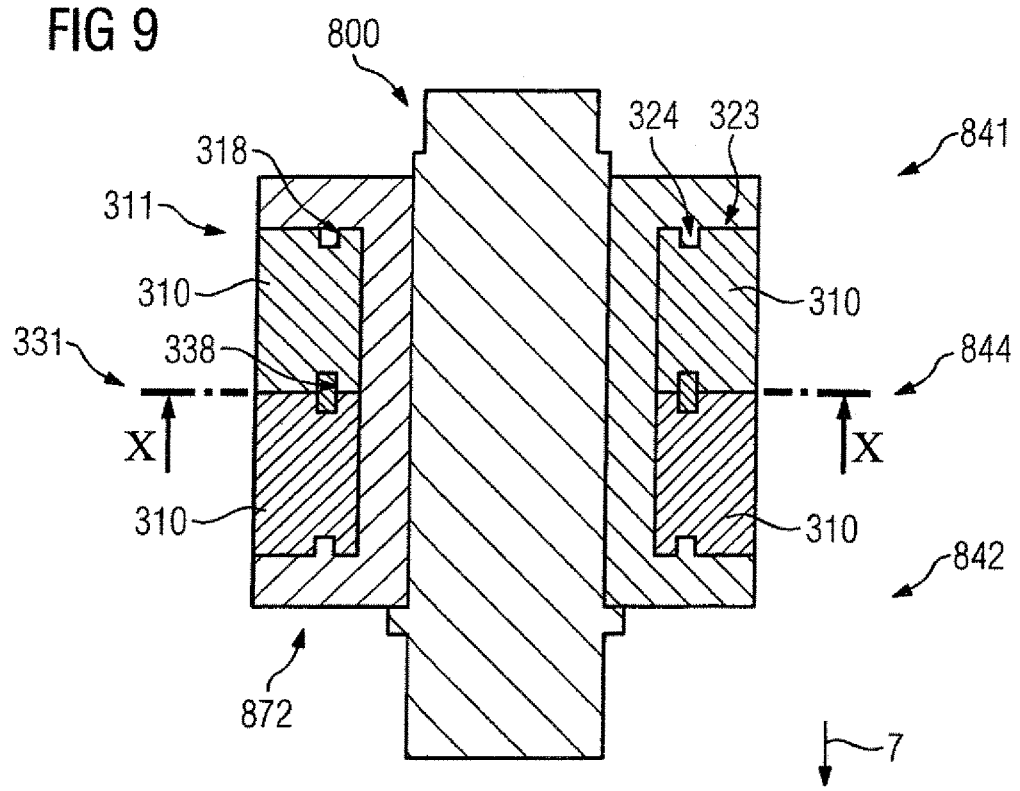
FIG. 9 is a longitudinal section view of a rotor having permanent magnets of a fourth exemplary embodiment of the invention.

FIG. 9 is a longitudinal section view of a fourth exemplary embodiment of an inventive rotor 800 having pairs of permanent magnets 310 in accordance with the invention. Features in FIG. 9 that are related to features described above with reference to FIG. 7 and FIG. 8 have similar reference numerals wherein the "7" prefix is replaced by an "8". The end surface at the first axial end 841 and the end surface at the second axial end 842 of the permanent magnet 310 of the rotor 800 are connected to the molded connection device 872 by positive engagement, and the rotor 800 has an annular connection part 876 in addition to the connection device 872. The two permanent magnets 310 in the rotor 800 have a connection 331 in the rotor area 844 between two permanent magnets 310. Thus a plurality of permanent magnets 310 are attached to the rotor 800, between the first axial end 841 and the second axial end 842 of the rotor 800, in axially-oriented pairs with one permanent magnet 310 located behind the other in the axial direction 7.

Figure 10:
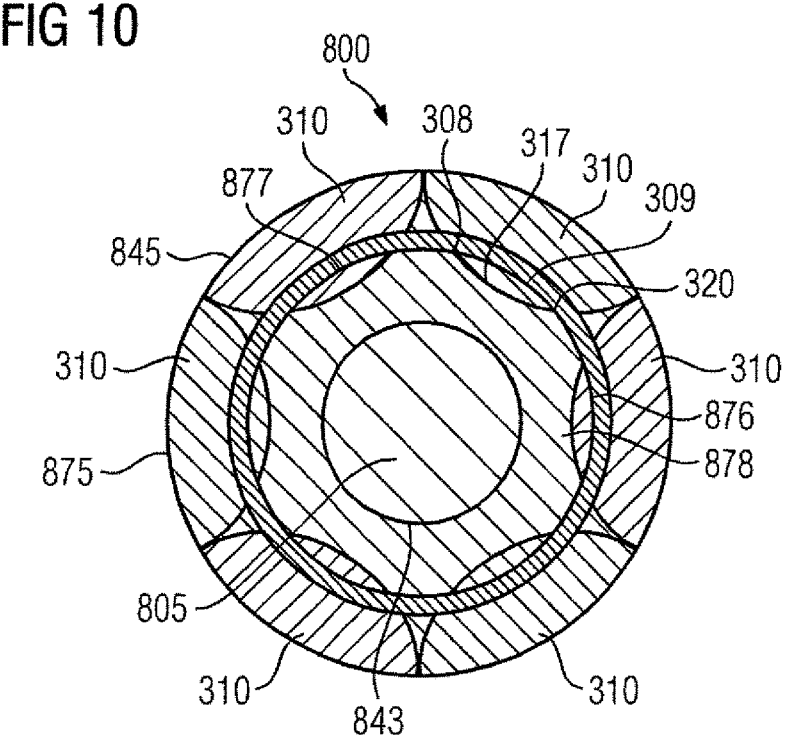
FIG. 10 is a cross section view of the rotor of FIG. 9, taken along the section line X-X.

FIG. 10 is a cross section view of the rotor 800 in FIG. 9 along the section line X-X. In the cross section 845 of the rotor 800 the connection device 872 adjoins the permanent magnets 310 and is concentric with the circular profile curve 875 of the rotor 800. The connection device 872 also includes an annular connection part 876 as part of that connection. As noted above, the inventive permanent magnets 310, and also other features shown in FIG. 9 and FIG. 10, have features described above with reference to first exemplary embodiment of FIG. 1 and other embodiments. The reference numerals of features in FIG. 9 and FIG. 10 related to other embodiments but not Identical with them, have substituted the prefix "8" for their prefixes.

In FIG. 9, the contour 323 defines a recess 324 in the end surface of the first end 311 of the permanent magnet 310 having a recess surface 318. The contour 323 defines a groove that is formed by the recess 324. The contour 323 has a boundary 309, which extends in an arcuate manner from a first point 308 on the second convex portion 317 to a second point 320 on the second convex portion 317 in FIG. 10. The annular connection part 876, i.e. the ring in the molded connection device 872, has a circumferential lip 877 for positive engagement with the boundary 309 of the contour 323 of an end surface of the permanent magnet 310. The connection part 876 thus runs in a groove formed by the two permanent magnets 310 that are disposed one behind the other in FIG. 10, in the axial direction 7. Between a permanent magnet 310 and the closest other permanent magnet 310 on the envelope curve 875 of the rotor 800, the annular connection part 876 is connected to a portion 878 of the molded connection device 872.

Because of the strength of that ring 876, the centrifugal forces permissible during operation of the rotor 800 can advantageously have high values without damaging the rotor 800. Since the centrifugal forces subject the material of the annular connection part 876 to tensile loading, the annular connection part 876 is preferably made of steel, a carbon fiber reinforced material or a fiberglass reinforced material. These materials provide an advantageously inexpensive and high-quality rotor 800. Preferably during production of the rotor 800, the permanent magnets 310 and the annular connection part 876 are positioned so as to be at least partially held in a fixed position by the injection molding instrument when the molded part 878 is produced by injecting the molding material, which is a synthetic material.

When the annular connection part 876 of the rotor 800 is produced from a fiberglass reinforced material or carbon fiber reinforced material, the rotor 800 can be produced in an advantageously inexpensive and high-quality manner without a shaft 805, and the annular connection part 876 can then be pre-tensioned by pressing the shaft 805 into an opening 843 provided for the shaft. Advantageously the fiberglass-reinforced material or carbon fiber-reinforced material can be sufficiently elastic that a frictional connection between the connection device 872 and the permanent magnet 310 is also provided in an advantageously inexpensive and high-quality manner when the shaft is pressing the shaft 805 into the opening 843.

FIG. 11 is a longitudinal section through a fifth exemplary embodiment of a rotor 900 having permanent magnets 410. Some features in FIG. 11 that are similar to but not the same as features described with reference to FIG. 1, FIG. 9 and FIG. 10 have reference numerals in FIG. 11 wherein their former prefix, the first digit, has been replaced with a "9" in FIG. 11. In this embodiment, the permanent magnet 410 has a contour 473 with a groove that has a boundary 409 that extends in an arcuate manner from the first point on the second convex portion to the second point on the second convex portion. In addition to this, the recess 424 is not as deep as the groove, and extends as far as the second convex portion of the permanent magnet 410.

FIG. 12 is a cross section of the rotor 900 of FIG. 11 along the section line XII-XII. The connection device 972 extends annularly in a cross section 945 of the rotor 900, adjoining the permanent magnets 410 and concentrically relative to the envelope curve 975 of the rotor 900. Moreover, the connection device 972 in the cross section 945 of the rotor 900 has an annular connection part 976 having a circumferential lip 977 that provides positive engagement with the boundary 409 of the contour 423 of the permanent magnet 410. The annular connection part 976 extends as far as the opening 943 for the shaft 905.

In the exemplary embodiment shown in FIG. 11 and FIG. 12, the annular connection part 976 is a disc that extends from its circumferential lip 977 to the opening 943. The connection part 976 is segmented along the opening 943 for the shaft 905 by a series of recesses 980. Therefore the rotor 900 can be attached to the shaft 905 in an advantageously inexpensive and high-quality manner using an interference fit, and centering of the permanent magnets 410 relative to the axis of rotation 4 can also be advantageously achieved. As in the fourth exemplary embodiment of a rotor 800 according to the invention, the connection part 976 can be fixed in the molded connection part 978 by injection molding.

Figure 13:
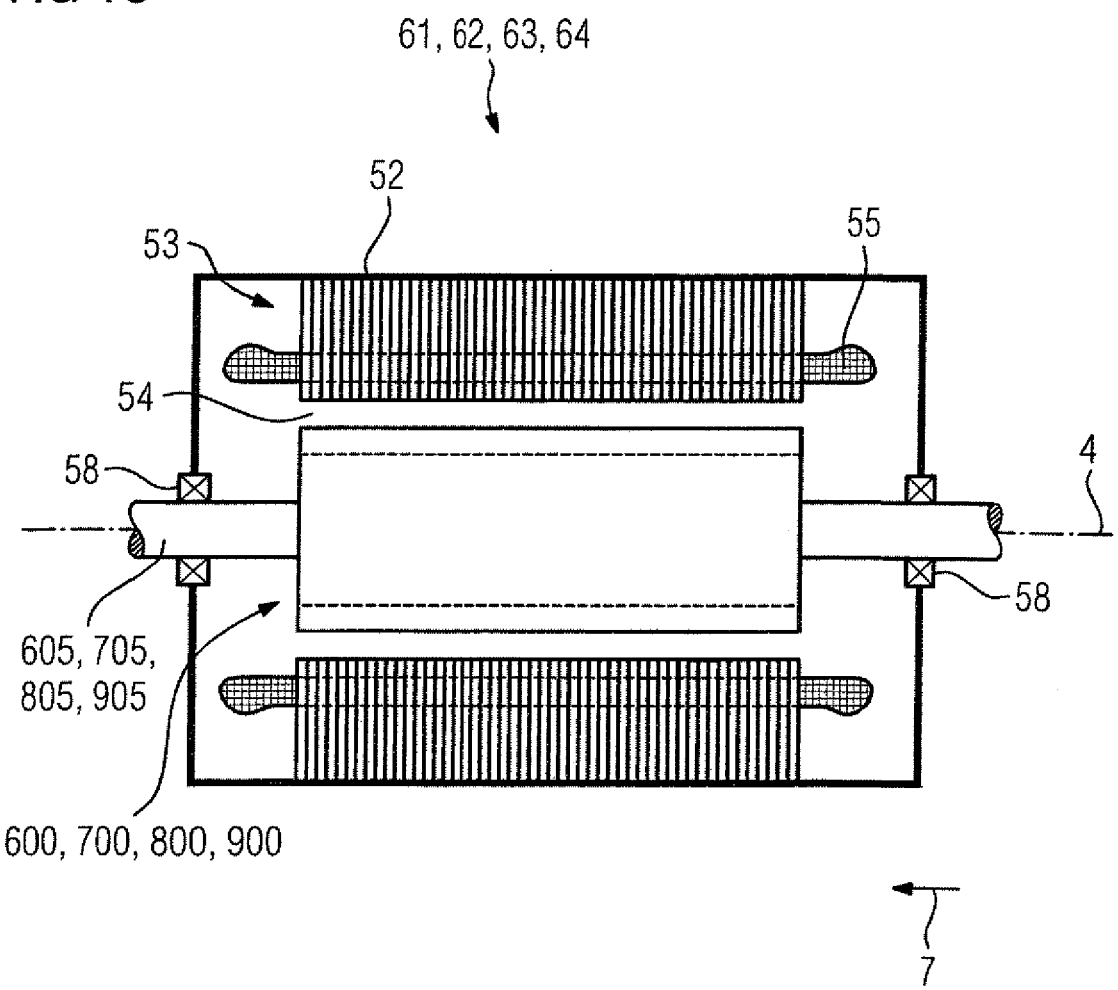
FIG. 13 shows a basic structure that can be used to provide several exemplary embodiments of electric machines in accordance with the invention.

FIG. 13 shows a basic structure that provides four principal exemplary embodiments of electric machines according to the invention designated by the reference numerals 61, 62, 63, 64. These exemplary embodiments have features that are described above with reference to FIGS. 1 to 12. Features that do not have reference numerals in FIG. 13 may be referred to using the reference numerals used in describing FIGS. 1 to 12.

The electric machines represent corresponding exemplary embodiments of inventive uses of permanent magnets in a rotor of an electric machine in accordance with the Invention. For example, the description of the first exemplary embodiment of the machine shown in FIG. 13 that has the reference numeral 61 will be described using the first reference numeral in a group of reference numerals relating to relating to a cited the feature of the electric machine 61. Likewise, the fourth exemplary embodiment, having the reference numeral 64 will be described using the last reference numeral in the group of reference numerals relating to relating to a cited the feature of the electric machine 64.

The electric machines 61, 62, 63, 64 comprise respective rotors 600, 700, 800, 900 attached to respective shafts 605, 705, 805, 905, rotatably supported for rotation about the axis of rotation 4 and a stator 53 that interacts magnetically with the respective rotor 600, 700, 800, 900 across an air gap 54 during operation of the electric machine 61, 62, 63, 64. The rotor 600, 700, 800, 900 is supported by first and second bearing devices 58 in a housing 52 of the electric machine 61, 62, 63, 64. The stator 53 is attached in a non-rotatable manner within the housing 52 and has at least one winding 55 that extends along the air gap 54 in an axial direction 7 relative to the axis of rotation 4.

Exemplary embodiments of electric machines 61, 62, 63, 64, use the permanent magnets 10, 110, 210, 310, 410, 1010 in their respective rotors 600, 700, 800, 900, as is, above with reference to the permanent magnets 10, 110, 210, 310, 410, 1010, and the rotors 600, 700, 800, 900.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A rotor for an electric machine, said rotor comprising:
a pair of permanent magnets, each magnet extending from a first end to a second end of the permanent magnet parallel to an axis of rotation, one magnet behind the other in the axial direction, each magnet having magnetization running from a south magnetic pole to a north magnetic pole in a cross section of the permanent magnet, each permanent magnet having a first convex portion disposed along an envelope curve of the rotor, and having respective end surfaces at a first end and a second end of the permanent magnet within the envelope curve, at least one of the end surfaces having a connection surface adapted for connecting a connection device to the permanent magnet, the magnetization of the permanent magnets running between the magnetic poles along an arcuate course in the first convex portion and the permanent magnet running along an arcuate course in a second convex portion, the first convex portion and a second convex portion of the cross section, providing a lens-shaped biconvex envelope curve; and
a connection device having a connection with the connection surface of the permanent magnet; the connection of the connection device with the permanent magnet being formed by a plastic coating that fuses them together.

2. The rotor of claim 1, wherein said connection is a first connection at a first axial end of the rotor, the rotor further comprising a second connection of the connection device with the end surface at the second end of the permanent magnet.

3. The rotor of claim 1, further comprising an annular connection part between the two permanent magnets in each pair that is concentric with the axis of rotation of the rotor, said annular connection part having a circumferential lip that provides positive engagement with the boundary of the contour of an end surface of the permanent magnet.

4. The rotor of claim 3, wherein the annular connection part is made of at least one of the following: steel or a carbon fiber-reinforced material or a fiberglass-reinforced material.

5. The rotor of claim 1, wherein connections between the connection device and the connection surfaces on the first and second ends of the permanent magnets are fused together by heating the plastic coating.

6. The rotor of claim 1, wherein the rotor has a first connection at a first axial end of the rotor to a shaft and a second connection between the connection device and the end surfaces of the second ends of the permanent magnets that extend along the axis of rotation, the rotor having shaft that extends along the axis of rotation, the shaft having knurling that extends in a direction parallel to the axis of rotation at least partway along the connection device so that injection molding produces secure attachment of the magnets.

7. The rotor of claim 1, wherein the connection device is fused to at least the surfaces of the end surfaces of the first ends of the permanent magnets to attach the permanent magnets.

8. The rotor of claim 1, wherein the surfaces of the first ends of the permanent magnets have a contour that provides positive engagement of the connection device with the permanent magnets.

9. The rotor of claim 8, wherein a shaft is pressed through the connection device, producing frictional engagement with the connection device that enhances the engagement between the end surfaces of the first ends of the permanent magnets and the connection device.

10. The rotor of claim 1, wherein an end surface of the permanent magnets has a contour that includes a ridge or recess.

11. The rotor of claim 10, wherein the a contour has a circular boundary.

12. The rotor of claim 10, wherein a surface on the second end of the permanent magnets has a similar contour that provides positive engagement with the end surfaces of the second ends of the permanent magnets.

13. The rotor of claim 10, wherein the contour has a boundary that extends in an arcuate course from a first point on two convex portions to a second point on two convex portions.

14. The rotor of claim 1, wherein an end surface of the permanent magnets has a contour that includes a ridge or recess.

15. The rotor of claim 1, wherein there is a recess on the first convex portion of the permanent magnet, between the north and south pole.

16. The rotor of claim 1, wherein the permanent magnet is sintered.

17. The rotor of claim 1, wherein the connection device adjacent to the permanent magnets extends annularly in a cross section of the rotor, is concentric with the envelope curve of the rotor, and includes an annular connection part having a circumferential lip.

18. The rotor of claim 17, wherein the annual connection part is a disc that has a central opening for the shaft that is segmented by a series of recesses and extends from the central opening to the circumferential lip.

19. An electric machine, comprising:
a rotor rotatably supported for rotation about an axis of rotation, and having a pair of permanent magnets, each magnet extending from a first end to a second end of the permanent magnet parallel to an axis of rotation, one magnet behind the other in the axial direction, each magnet having magnetization running from a south magnetic pole to a north magnetic pole in a cross section of the permanent magnet, each permanent magnet having a first convex portion disposed along an envelope curve of the rotor, and having respective end surfaces at a first end and a second end of the permanent magnet within the envelope curve, at least one of the end surfaces having a connection surface adapted for connecting a connection device to the permanent magnet, the magnetization of the permanent magnets running between the magnetic poles along an arcuate course in the first convex portion and the permanent magnet running along an arcuate course in a second convex portion, the first convex portion and a second convex portion of the cross section, providing a lens-shaped biconvex envelope curve;
a connection device having a connection with the connection surface of the permanent magnet; the connection of the connection device with the permanent magnet being formed by a plastic coating that fuses them together; and
a stator located to magnetically interact with the rotor across an air gap during the operation of the electric machine.

* * * * *